(12) United States Patent
Beaufrere

(10) Patent No.: US 8,016,243 B2
(45) Date of Patent: Sep. 13, 2011

(54) AIRCRAFT BACKUP CONTROL

(75) Inventor: Henry L. Beaufrere, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 520 days.

(21) Appl. No.: 11/549,069

(22) Filed: Oct. 12, 2006

(65) Prior Publication Data
US 2010/0025544 A1 Feb. 4, 2010

(51) Int. Cl.
*B64C 15/00* (2006.01)
(52) U.S. Cl. .......................... 244/194; 244/52; 244/75.1
(58) Field of Classification Search ................... 244/52, 244/221, 171.2, 169, 164, 75.1, 193, 194
See application file for complete search history.

(56) References Cited

U.S. PATENT DOCUMENTS

| 5,330,131 A | * | 7/1994 | Burcham et al. | 244/76 R |
| 6,041,273 A | * | 3/2000 | Burken et al. | 701/3 |
| 6,102,330 A | * | 8/2000 | Burken et al. | 244/76 R |

OTHER PUBLICATIONS

Jonathan How, course materials for 16.31 Feedback Control Systems, Fall 2007. MIT OpenCourseWare(http://ocw.mit.edu), Massachusetts Institute of Technology. Downloaded on Jul. 10, 2008.*
Burcham, Frank W., Jr., C. Gordon Fullerton, and Trindel A. Maine. Manual Manipulation of Engine Throttles for Emergency Flight Control. (NASA Technical Memorandum 212045, Jan. 2004).*
Burcham, Frank W., Jr., John Burken, Trindel A. Maine, and John Bull. Emergency Flight Control Using Only Engine Thrust and Lateral Center-of-Gravity Offset: A First Look. (NASA Technical Memorandum 4798, Jul. 1997).*
"Advances in Thrust-Based Emergency Control of an Airplane." NASA. Sep. 1, 2003. retrieved from <http://www.techbriefs.com/component/content/article/964> on Dec. 29, 2008.*
Burcham, Frank W. Jr. and C. Gordon Fullerton. "Controlling Crippled Aircraft—With Throttles." NASA Technical Memorandum 104238. Sep. 1991.*
Gilyard, Glenn B., Joseph L. Conley, Jeanette Le, and Frank W. Burcham Jr. A Simulation Evaluation of a Four Engine Jet Transport Using Engine Thrust Modulation for Flightpath Control. NASA Technical Memorandum 4324. Sep. 1991.*
Burken, John et al. Longitudinal Emergency Control System Using Thrust Modulation Demonstrated on an MD-11 Airplane. AIAA 96-3062. Jul. 3, 1996.*
Williams-Hayes, Peggy. "Flight Test Implementation of a Second Generation Intelligent Flight Control System." NASA/TM-2005-213669. Nov. 2005.*
Yu, Gwo-Ruey. "Nonlinear Fly-By-Throttle H_infinity Control Using Neural Networks." Asian Journal of Control, vol. 3, No. 2, pp. 163-169, Jun. 2001.*
Chu, Chung-Kuang et al. "Gain Scheduling for Fly-By-Throttle Flight Control Using Neural Networks." Proceedings of the 35th Conference on Decision and Control. Dec. 1996.*
Jonckheere, Edmond. "Propulsion Control of Crippled Aircraft by H_infinity Model Matching." IEEE Transactions on Control System Technology, vol. 7, No. 2, Mar. 1999.*

* cited by examiner

*Primary Examiner* — Timothy D. Collins
*Assistant Examiner* — Michael Kreiner
(74) *Attorney, Agent, or Firm* — Haynes & Boone, LLP.

(57) ABSTRACT

A method is disclosed for controlling an aircraft when the hydraulic system of the aircraft has been compromised. The method may include resealing at least one gain vector of a digital fly-by-wire, lower-order, full-state feedback control in at least one axis. The gain(s) may then used by a digital control to modulate engine thrust. In this manner, engine thrust modulation may be used for stabilization and control of control-configured aircraft without requiring a substantial change in piloting technique.

4 Claims, 2 Drawing Sheets

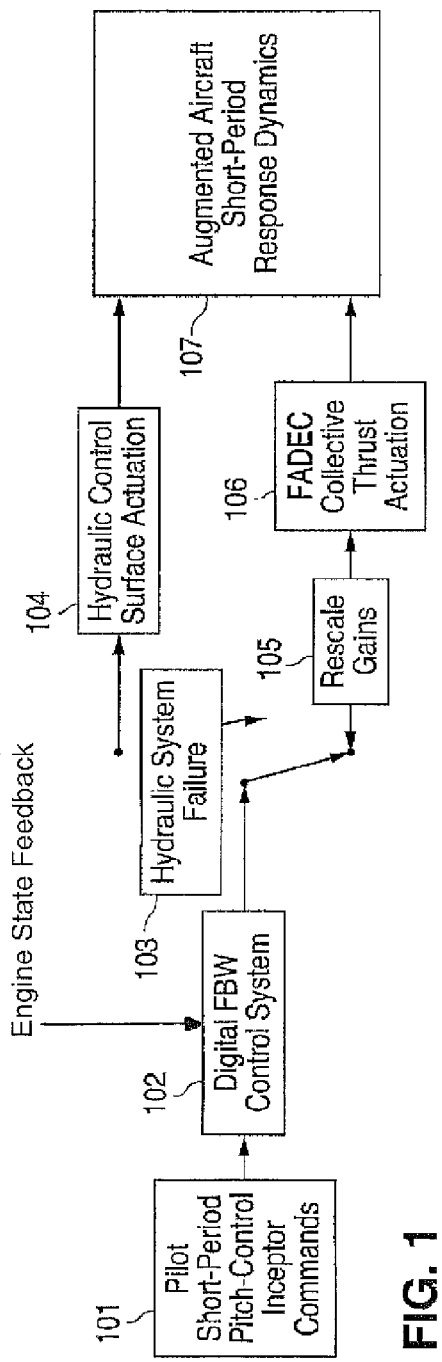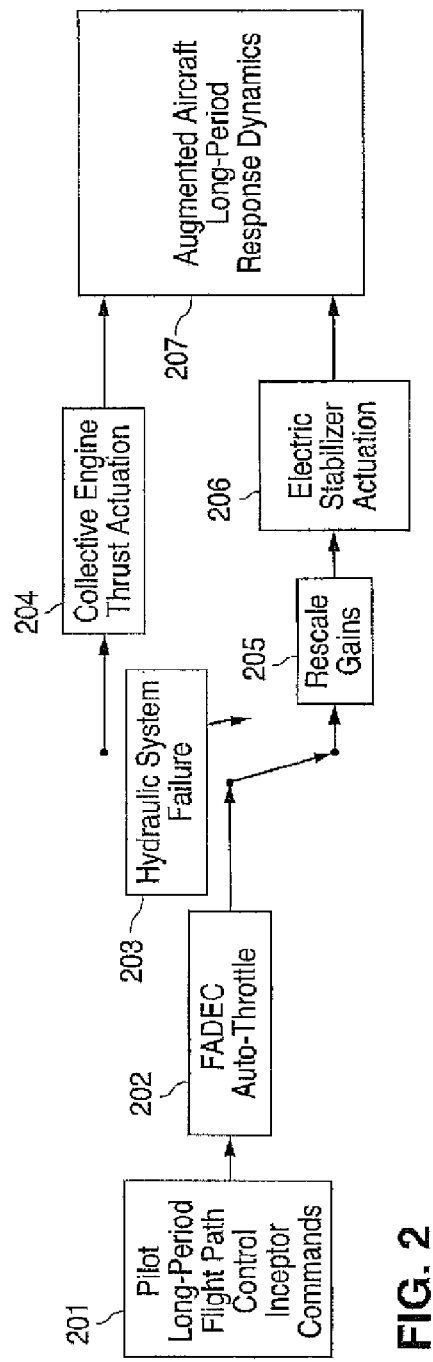

AIRCRAFT BACKUP CONTROL

TECHNICAL FIELD

The present invention relates generally to control systems, and, more particularly, to a backup flight control system for aircraft.

BACKGROUND

Aircraft commonly use hydraulic systems to facilitate control of their movement through the air. That is, hydraulic systems respond to controls in the cockpit so as to cause flight control surfaces to move in a manner that results in desired changes in the attitude and heading of the aircraft.

Although redundant hydraulic systems are commonly utilized, there are still occasions when a complete failure of all of the hydraulic systems renders the flight control surfaces uncontrollable. For example, such a complete failure may occur in the event of a terrorist attack. A shoulder fired missile or an onboard bomb may completely disable an aircraft's hydraulic systems.

In such instances, it is known to use engine thrust in an attempt to control the attitude and heading of the aircraft. However, according to contemporary practice, this is accomplished by carefully manipulating the aircraft's throttles.

Use of the aircraft's throttles to control the attitude and heading of the aircraft is inherently difficult and limited in effectiveness. Use of the aircraft's throttles to control attitude and heading requires substantial skill. However, even when performed by a skillful pilot, manipulation of the throttles does not always provide the desire changes in attitude and heading.

Indeed, sometimes manipulation of the throttles results in undesirable changes in attitude and heading. Some of the manipulations required for aircraft control are counterintuitive and are therefore not easily practiced by a human operator. This is particularly true for aircraft that are inherently unstable and/or require command limiting and thus typically utilize fly-by-wire control augmentation.

As a result, there is a need for an aircraft backup control system that does not rely upon the skill of a pilot to use engine thrust so as to control the aircraft's attitude and heading.

SUMMARY

Systems and methods are disclosed herein to facilitate controlling an aircraft in the event that the use of hydraulic power is lost. More particularly, according to an example of an embodiment of the present invention conventional pilot-vehicle, cockpit interfaces, including a column-wheel arrangement or stick for pitch and roll control and pedals for yaw control, are used to control the aircraft via engine thrust modulation. These pilot-vehicle interface devices, are herein more generally referred to as inceptors, may be used in a manner that is substantially identical to the manner in which they are used during normal operation (with hydraulic power).

For example, engine thrust may be used to control the characteristic rigid body dynamic modes of the aircraft including the longitudinal short-period mode, the lateral-directional Dutch roll mode and roll subsidence mode. More particularly, according to an example of an embodiment of the present invention at least one set of gains or gain vector of a digital fly-by-wire, lower order, full-state feedback control is rescaled in at least one axis and the gain(s) are then used to modulate engine thrust. The gains of all axes or of any desired combination of axis may be rescaled and used to modulate engine thrust.

Thus, although pitch and roll are the most important axes for attitude control, pitch gain, roll gain, and yaw gain, or any desired combination thereof, may be rescaled and used to modulate engine thrust. The gain(s) may be rescaled in a manner that facilitates control of the aircraft in substantially the same manner as when a primary hydraulically actuated control surface system of the vehicle is used. Engine thrust may be used to control the vehicle characteristic modes in pitch, roll and yaw. In this manner, the use of only conventional cockpit inceptors to control at least one of pitch, roll, and/or yaw is facilitated. Thus, pitch, roll, and/or yaw may be controlled without using the aircraft's throttles and without using any other controls other than the conventional inceptors.

According to an example of an embodiment of the present invention, a system for controlling a vehicle comprises a scaler configured to rescale at least one gain vector of a digital, fly-by-wire, lower-order, full-state feedback control in at least one axis and a controller configured to use the gain(s) to modulate engine thrust. The scaler and the control may be implemented in either hardware or software.

According to an example of an embodiment of the present invention, a control system for aircraft comprises means for rescaling gains of lower order feedback control system and means for modulating engine thrust in response to the control commands so as to control aircraft pitch or yaw axes in substantially the same manner as the primary hydraulically actuated control surface system.

The control system may further comprise means to provide feedback of the engine state when the backup system is engaged. The control system may further comprise means to rescale auto-throttle gains to drive the electric stabilizer to maintain trim speed.

One or more embodiments of the present invention facilitate the use of engine thrust modulation for stabilization and control of control-configured aircraft without requiring a substantial change in piloting technique.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1 shows a block diagram illustrating short-period control in accordance with an example of an embodiment of the present invention;

FIG. 2 shows a block diagram illustrating long-period control in accordance with an example of an embodiment of the present invention;

Figure 3:
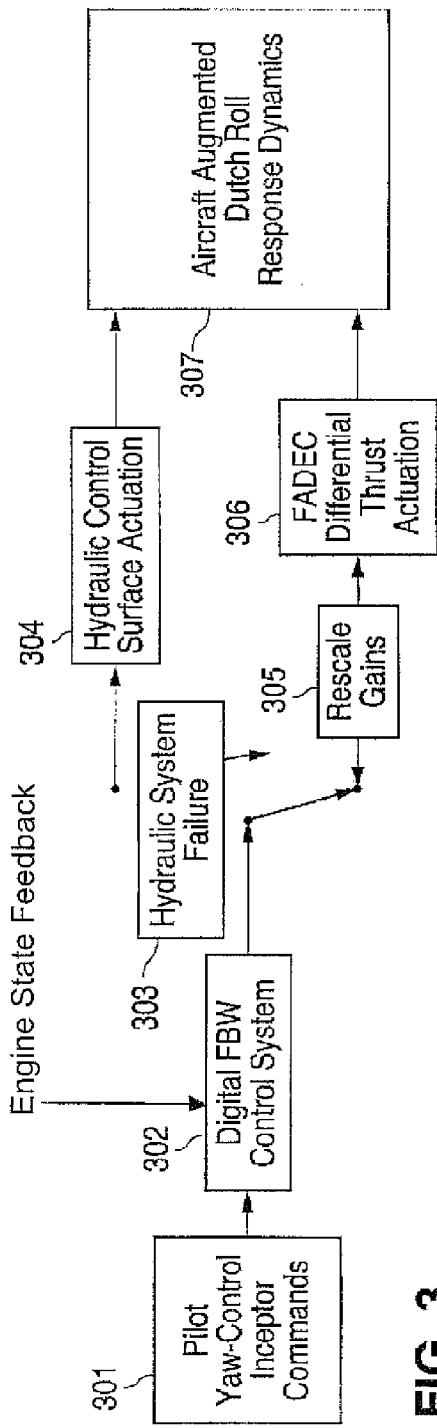
FIG. 3 shows a block diagram illustrating yaw control in accordance with an example of an embodiment of the present invention.

Embodiments of the present invention and their advantages are best understood by referring to the detailed description

DETAILED DESCRIPTION

The advent of contemporary highly reliable, flight-critical, digital fly-by-wire control systems has allowed aircraft designers to take advantage of control-configured designs that maximize aerodynamic performance and reduce aircraft weight. Such control-configured designs may include relaxed static pitch and/or yaw stability, angle-of-attack and/or sideslip limiting, load-factor and/or pitch-rate limiting, lateral-acceleration and/or yaw-rate limiting, and multi-control surface usage.

However, as the name implies, contemporary control-configured designs are highly dependent on the digital fly-by-wire flight control computers that must continuously direct the control surfaces to move in a predetermined way in response to pilot inputs and external disturbances so as to maintain control of the aircraft. If the ability to power these flight control surfaces is lost, then a backup flight control system that is compatible with the complex demands of the digital fly-by-wire flight control system is desired.

The wing-mounted engines on multi-engine aircraft offer a source of control power in both the longitudinal and lateral-directional axes. Collective modulation of the engines provides pitch control power and differential modulation of the engines provides yaw control power, as well as roll power via the relatively large roll-yaw-coupling aerodynamics inherent in sweptback wings, i.e., the dihedral effect. Even the slow thrust response of high bypass engines may be managed to maintain safe flight and landing.

However, inherent in contemporary thrust-modulated augmentation methods is the assumption that the aircraft is configured such that its stability and control characteristics are designed into the airframe aerodynamics. These augmentation methods do not anticipate using thrust modulation to maintain stability and control of airplanes that are highly control-configured. In fact, these methods primarily rely on controlling the long-period aircraft dynamic mode to alter its flight path. They are substantially inadequate for controlling control-configured aircraft characteristics such as statically unstable longitudinal and/or lateral-directional short-period modes generally referred to as the short-period mode in pitch, the Dutch roll mode in yaw and the roll-subsidence mode in roll.

Precise control of short-period dynamic modes is important for enabling the use of thrust modulation in control-configured aircraft designs. One or more embodiments of the present invention use precise control of the short-period aircraft dynamics to allow a substantially seamless transition from the primary hydraulic actuation system to thrust modulation.

Furthermore, one important advantage of at least one embodiment of the present invention is that any changes in piloting techniques are minimized. This is in contrast to contemporary methods, wherein substantial changes in piloting techniques are required in order to use engine thrust in an attempt to compensate for lose of control of the aircraft's flight control surfaces.

According to an example of an embodiment of the present invention, a fly-by-wire engine thrust control system is provided. This system facilitates the use of engine thrust modulation as a backup for stabilization and control of highly control-configured aircraft without a substantial change in piloting technique.

Thus, one or more embodiments of the present invention provide fly-by-wire control algorithms that facilitate the use of thrust modulation as a backup control power source for highly control-configured aircraft without a change in piloting technique.

One or more embodiments of the present invention mitigate the need for a costly backup control power system, such as one that comprises redundant electrical actuators and/or hydraulic systems that are configured to maintain stability and control of highly control-configured aircraft in the event of loss of the main hydraulic actuation system. Also, because the invention retains aircraft response dynamics similar to the primary control system, the need for costly pilot training is mitigated. This is true even for the non-control-configured aircraft.

According to an example of an embodiment of the present invention, pilot commands are processed so as to modulate engine thrust such that the dynamic response of the aircraft is similar to that resulting from the use of hydraulically actuated control surfaces. Except for lower aircraft transient response amplitudes in response to pulse commands for the thrust-modulated controller, due to the slower responding engine relative to the hydraulic actuators, the aircraft response dynamics (frequency and damping) are essentially the same when using engine thrust for control as when using conventional hydraulics. Significantly, identical pilot pulse inputs to the roll-inceptor yield substantially the same steady-state bank angle, and pulse inputs to the pitch-inceptor yield nearly the same steady-state flight-path angle.

An exemplary embodiment of the present invention comprises resealing the gains of digital fly-by-wire lower-order, full-state feedback control in the pitch and yaw axes such that they may be used to modulate engine thrust to control the aircraft in the same manner as the primary hydraulically actuated control surface system. This feedback structure may include feedback of the controller actuation state. Thus, the feedback structure may include feedback of the engine dynamics when the backup system is engaged. The auto throttle gains may also be rescaled to drive the electric stabilizer rather than the engine to maintain trim speed.

According to an example of an embodiment of the present invention, when the hydraulic system is lost, then the signal path to the hydraulic actuators is switched off and redirected to a digital engine control system that commands changes in engine thrust according to movement of conventional cockpit inceptors. Thus, the pilot does not have to alter behavior to control the aircraft and additional substantial training is not required.

When the signal path is redirected to the digital engine control system, then the digital fly-by-wire computer gains are rescaled proportional to the control surface aerodynamic derivatives and analogous thrust coefficient derivatives, along with any other gain corrections and/or control-loop compensation required to retain desired flying quality responses. In this manner, the aircraft response dynamics remain consistent with respect to those of the hydraulically actuated control surfaces.

According to an example of an embodiment of the present invention, the pilot interface for control of the roll axis via the dihedral effect may be either through the pedals or the column wheel. Also, the auto throttle commands to the digital engine control system that maintains trim speed may be redirected to the electric stabilizer to perform the same function with the auto throttle gains rescaled accordingly. Speed may be altered by changing the auto throttle reference speed. Use of the throttles for commanding a change in climb angle may remain the same.

Contemporary engine thrust control systems do not account for the need for precise control of the short-period mode and/or Dutch roll mode required for highly control-configured vehicles. Also because they do not address control of these modes directly, contemporary engine thrust control systems require changes in piloting technique. They also provide no compensation for the low bandwidth response dynamics of the engine relative to the hydraulic actuators greatly restricting their capability.

An example of a control method for an aircraft comprises resealing gains of lower-order control commands and modulating engine thrust in response to the control commands so as to control aircraft pitch or yaw axes in substantially the same manner as the primary hydraulically actuated control surface system. The control system may further comprise providing feedback of the engine actuation states when the backup system is engaged. The control system may further comprise resealing auto throttle gains to drive the electric stabilizer to maintain trim speed.

FIG. 1 shows short-period control of an aircraft according to an example of an embodiment of the present invention. In the event that the hydraulic system is lost, the fly-by-wire (FBW) signal path to the pitch hydraulic actuators is redirected to the full-authority digital engine control system (FADEC) 106 with the fly-by-wire gains rescaled to command changes in collective engine thrust such that the augmented short-period response dynamics remain substantially unchanged.

The full-authority digital engine control system 106 uses the rescaled gains to control engine thrust. Thus, when the pilot pulls back on the stick, for example, the full-authority digital engine control system increases collective engine thrust in a manner that causes the aircraft's angle of attack to change with a frequency and damping (that is determined, at least in part, by the rescaled gains) that is substantially the same as when hydraulic control surface actuation is used.

More particularly, short-period pitch control commands made by the pilot are intercepted, as indicated in block 101. These commands are provided to the digital fly-by-wire control system 102 according to contemporary practice. Prior to a hydraulic system failure, the digital fly-by-wire control system 102 provides control signals for hydraulic control surface actuation, as indicated in block 104. This results in contemporary augmented aircraft short-period response dynamics, as indicated in block 107.

However, according to an example of an embodiment of the present invention, upon hydraulic system failure as indicated in block 103, control is switched to gain rescaler 105 which rescales the digital fly-by-wire gains and provides rescaled gain control signals to a controller, e.g., full-authority digital engine control system 106. The full-authority digital engine control system 106 facilitates collective thrust actuation that results in short-period pitch control. Thus, augmented aircraft short-period response dynamics are again provided, as indicated in block 107.

FIG. 2 shows long-period control of an aircraft according to an example of an embodiment of the present invention. In the event that the hydraulic system is lost, the full-authority digital engine control system auto-throttle signal path to engines is redirected to the electric stabilizer with the gains rescaled such that the augmented long-period response remains substantially unchanged.

The full-authority digital engine control system 202 uses the rescaled gains to control electric stabilizer actuation. Thus, when the pilot selects a new trim speed, for example, the full-authority digital engine control system controls electric stabilizer actuation in conjunction with the digital fly-by-wire short-period thrust modulation in a manner that causes the aircraft to change speed with a frequency and damping (that is determined, at least in part, by the rescaled gains) that is substantially the same as when direct thrust modulation is used.

More particularly, long-period pitch control commands made by the pilot are intercepted, as indicated in block 201. These commands are provided to the full-authority digital engine control system auto-throttle 202. Prior to a hydraulic system failure, the full-authority digital engine control system auto-throttle 202 provides control signals for collective engine thrust actuation, as indicated in block 204. This results in contemporary augmented aircraft long-period response dynamics, as indicated in block 207.

However, according to an example of an embodiment of the present invention, upon hydraulic system failure as indicated in block 203, control is switched to gain rescaler 205 which rescales the auto-throttle gains and provides rescaled gain control signals to electric stabilizer actuation 206. The electric stabilizer actuation 206 facilitates collective thrust actuation indirectly via the digital fly-by-wire short-period thrust modulation signals that results in long-period pitch control. Thus, augmented aircraft long-period response dynamics are again provided, as indicated in block 207.

FIG. 3 shows yaw control of an aircraft according to an example of an embodiment of the present invention. In the event that the hydraulic system is lost, the fly-by-wire signal path to the yaw hydraulic actuators is redirected to the full-authority digital engine control system 306 with the fly-by-wire gains rescaled to command changes in differential engine thrust such that the augmented Dutch roll response dynamics remains substantially unchanged.

The full-authority digital engine control system 306 uses the rescaled gains to control engine thrust. Thus, when the pilot effects a yaw to the right, for example, the full-authority digital engine control system 306 increases engine thrust differentially in a manner that causes the aircraft to change sideslip angle at a frequency and damping (that is determined, at least in part, by the rescaled gains) that is substantially the same as when hydraulic control surface actuation is used.

More particularly, yaw control commands made by the pilot are intercepted, as indicated in block 301. These commands are provided to the digital fly-by-wire control system 302 according to contemporary practice. Prior to a hydraulic system failure, the digital fly-by-wire control system 302 provides control signals for hydraulic control surface actuation actuation, as indicated in block 304. This results in contemporary augmented aircraft Dutch roll response dynamics, as indicated in block 307.

However, according to an example of an embodiment of the present invention, upon hydraulic system failure as indicated in block 303, control is switched to gain rescaler 305 which rescales gains and provides rescaled gain control signals for full-authority digital engine control system differential thrust actuation 306. The full-authority digital engine control system differential thrust actuation 306 facilitates differential thrust actuation that results in yaw control. Thus, augmented aircraft Dutch roll response dynamics are again provided, as indicated in block 307.

Figure 4:
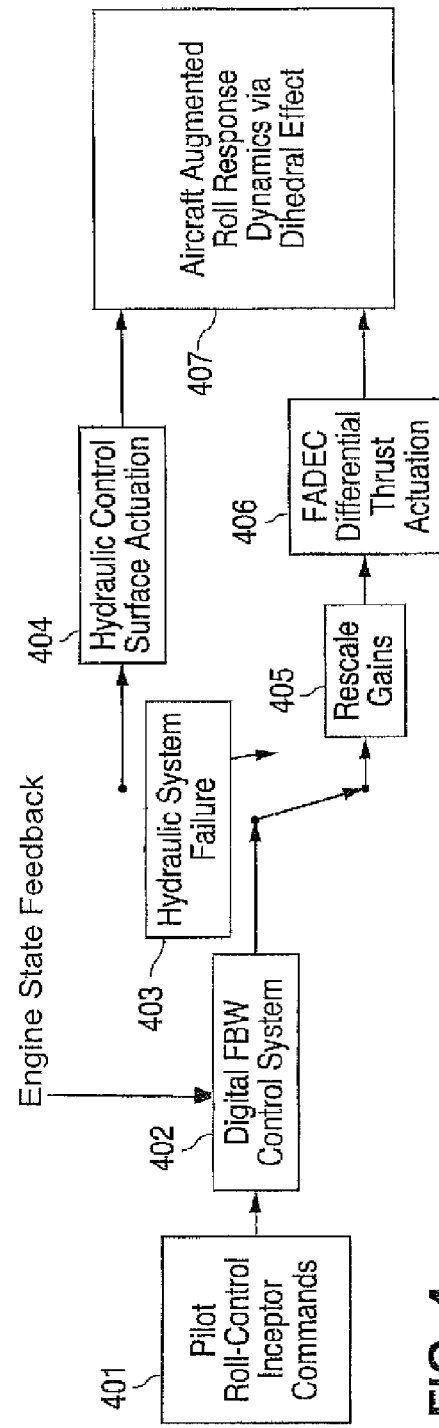
FIG. 4 shows a block diagram illustrating roll control in accordance with an example of an embodiment of the present invention.

FIG. 4 shows roll control of an aircraft according to an example of an embodiment of the present invention. In the event that the hydraulic system is lost, the fly-by-wire signal path to the roll hydraulic actuators is redirected to the full-authority digital engine control system with the fly-by-wire gains rescaled to command changes in differential engine thrust such that the augmented roll response dynamics via the dihedral effect remains substantially unchanged.

The full-authority digital engine control system 406 uses the rescaled gains to control engine thrust. Thus, when the pilot effects a roll to the right, for example, the full-authority digital engine control system 406 increases engine thrust differentially in a manner that causes the aircraft to roll to the right with a time constant (that is determined, at least in part, by the rescaled gains) that is substantially the same as when hydraulic control surface actuation is used.

More particularly, roll control commands made by the pilot are intercepted, as indicated in block 401. These commands are provided to the digital fly-by-wire control system 402 according to contemporary practice. Prior to a hydraulic system failure, the digital fly-by-wire control system 402 provides control signals for hydraulic control surface actuation, as indicated in block 404. This results in contemporary augmented aircraft roll response dynamics via the dihedral effect, as indicated in block 407.

However, according to an example of an embodiment of the present invention, upon hydraulic system failure as indicated in block 403, control is switched to gain rescaler 405 which rescales gains and provides rescaled gain control signals for full-authority digital engine control system differential thrust actuation 406. The full-authority digital engine control system differential thrust actuation 406 facilitates a differential thrust that results in roll control. Thus, augmented aircraft roll response dynamics are again provided, as indicated in block 407.

Although the discussion herein is generally with respect to an aircraft, those skilled in the art will appreciate that one or more embodiments of the present invention are similarly applicable to a variety of other airborne vehicles such as missiles, unmanned aerial vehicles (UAV's), and the like. Indeed, one or more embodiments of the present invention may find application in waterborne or other non-airborne vehicles such as submarines, torpedoes, and the like.

One or more embodiments of the present invention may be implemented solely in software. For example, on fly-by-wire aircraft the computer that receives flight control inputs from the cockpit and provides flight control outputs to devices that move flight control surfaces may be programmed to run such software. Alternatively, a non-fly-by-wire aircraft may be modified (such as by adding a computer and/or other dedicated hardware, e.g., dedicated processors) to practice one or more embodiments of the present invention.

One or more embodiments of the present invention provide an aircraft backup control system that facilitates control of an aircraft so as to enable safe flight and landing in the event that proper operation of the hydraulic system is compromised.

One or more embodiments of the present invention provide an economically viable backup thrust modulation system for multi-engine aircraft, particularly control-configured aircraft, in the event of a total loss of the primary hydraulic control surface actuation system without requiring a change in piloting techniques. In this manner, loss of passengers, crew, cargo, and/or the aircraft may be avoided.

Embodiments described above illustrate but do not limit the invention. It should also be understood that numerous modifications and variations are possible in accordance with the principles of the present invention. Accordingly, the scope of the invention is defined only by the following claims.

I claim:

1. A method for controlling an aircraft, the method comprising:
    processing a pilot short-period pitch control command through a fly-by-wire control system to provide corresponding short-period pitch control fly-by-wire computer gains;
    re-scaling the short-period pitch control computer gains to provide re-scaled short-period pitch control computer gains;
    commanding a full-authority digital engine control system (FADEC) with the re-scaled short-period pitch control computer gains such that the FADEC modulates engine thrust to control a short period pitch response for the aircraft;
    processing a pilot airspeed command through a FADEC auto-throttle to provide corresponding FADEC auto-throttle control gains;
    re-scaling the FADEC autothrottle control gains to provide re-scaled FADEC autothrottle gains; and
    actuating an electric stabilizer for the aircraft according to the re-scaled FADEC autothrottle control gains to control an airspeed for the aircraft.

2. The method as recited in claim 1, wherein processing the pilot short-period pitch command through the fly-by-wire control system further comprises using feedback of an engine state.

3. The method of claim 1, further comprising:
    processing a pilot short-period yaw control command through the fly-by-wire control system to provide corresponding short-period yaw control fly-by-wire computer gains;
    re-scaling the short-period yaw control computer gains to provide re-scaled short- period yaw control computer gains; and
    commanding the full-authority digital engine control system (FADEC) with the re-scaled short-period yaw control computer gains such that the FADEC modulates differential engine thrust to control a short period yaw response for the aircraft.

4. The method of claim 1, further comprising:
    processing a pilot short-period roll control command through the fly-by-wire control system to provide corresponding short-period roll control fly-by-wire computer gains;
    re-scaling the short-period roll control computer gains to provide re-scaled short-period roll control computer gains; and
    commanding the full-authority digital engine control system (FADEC) with the re-scaled short-period roll control computer gains such that the FADEC modulates differential engine thrust to control a short period roll response for the aircraft.

* * * * *